Jan. 15, 1963  M. J. KELLING  3,073,661
DISPLAY CASE
Filed July 20, 1959  2 Sheets-Sheet 1
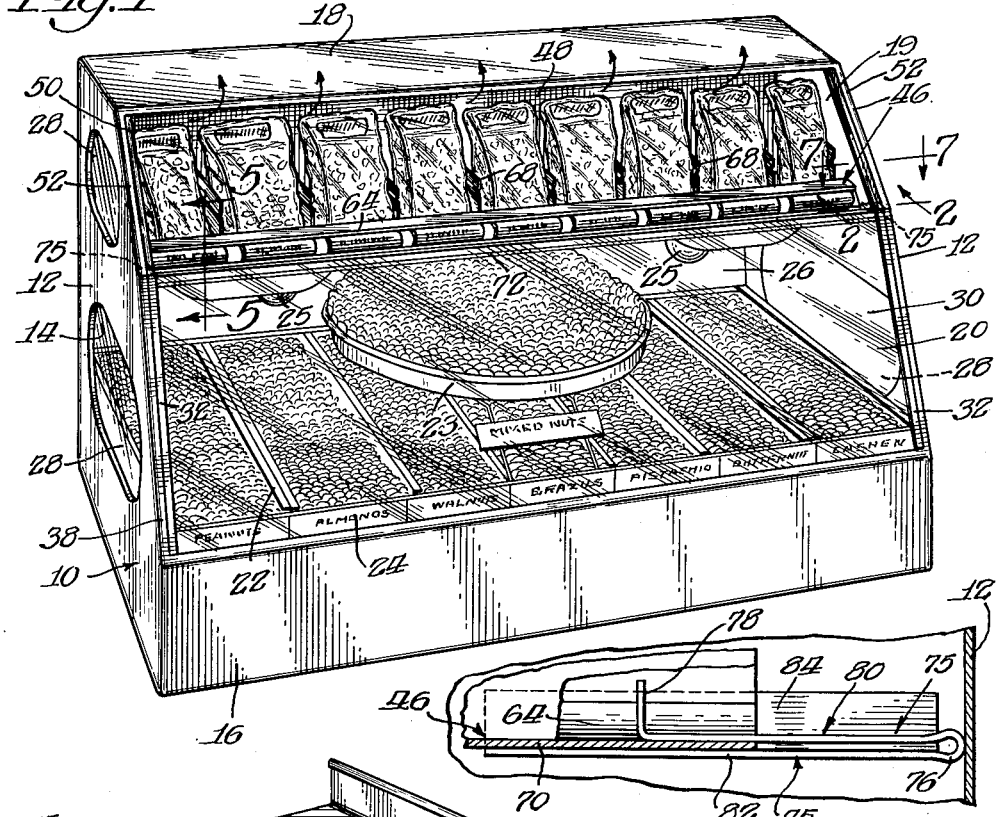
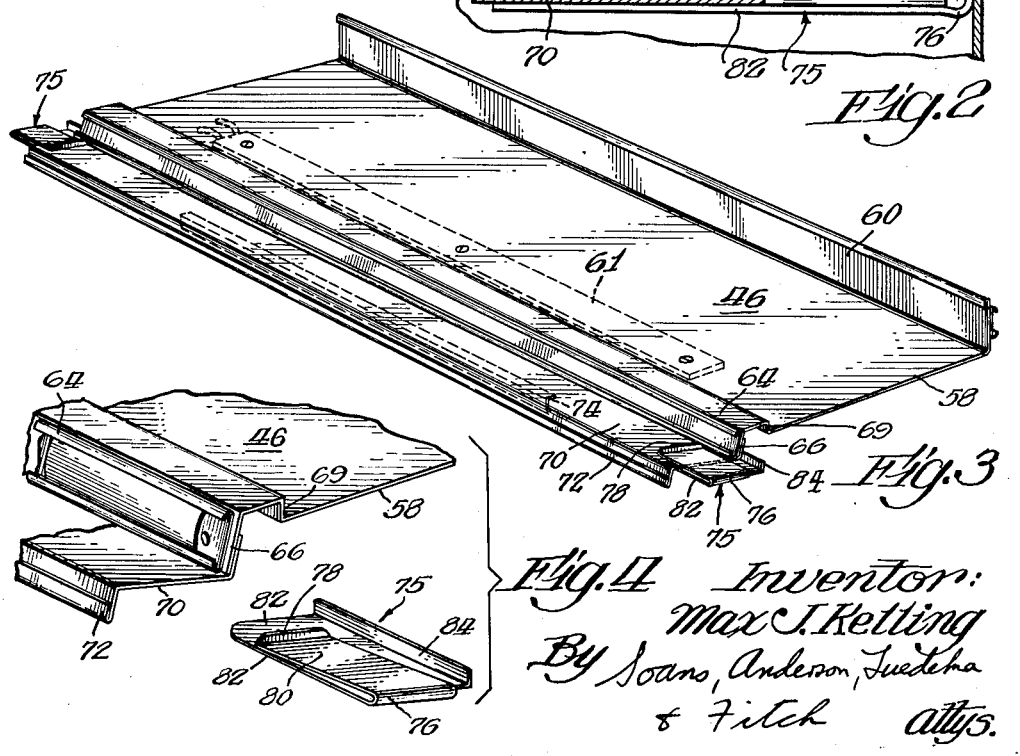
Inventor:
Max J. Kelling
By Soans, Anderson, Luedeka & Fitch
attys.

Jan. 15, 1963  M. J. KELLING  3,073,661
DISPLAY CASE
Filed July 20, 1959  2 Sheets-Sheet 2
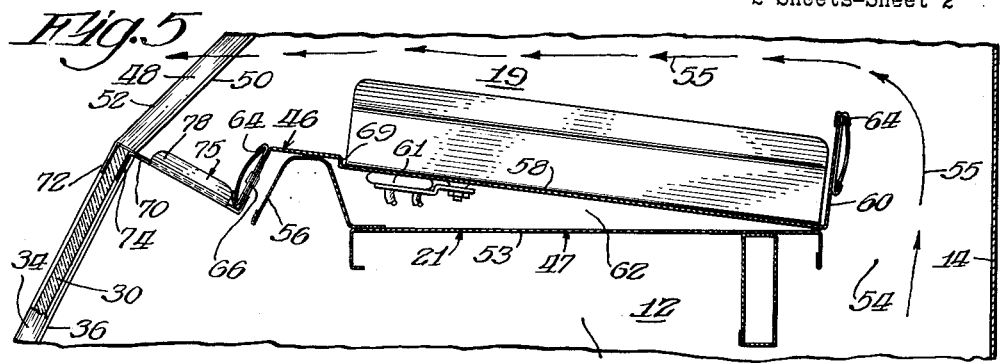
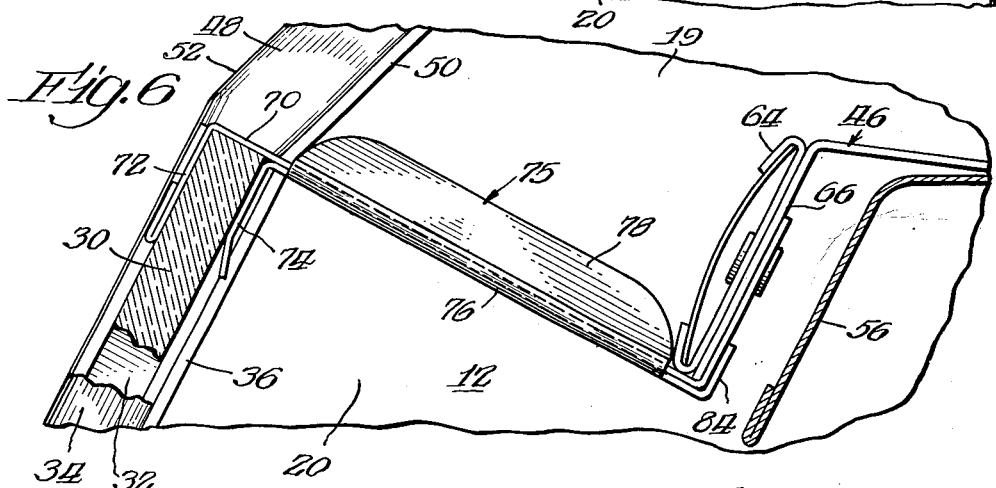
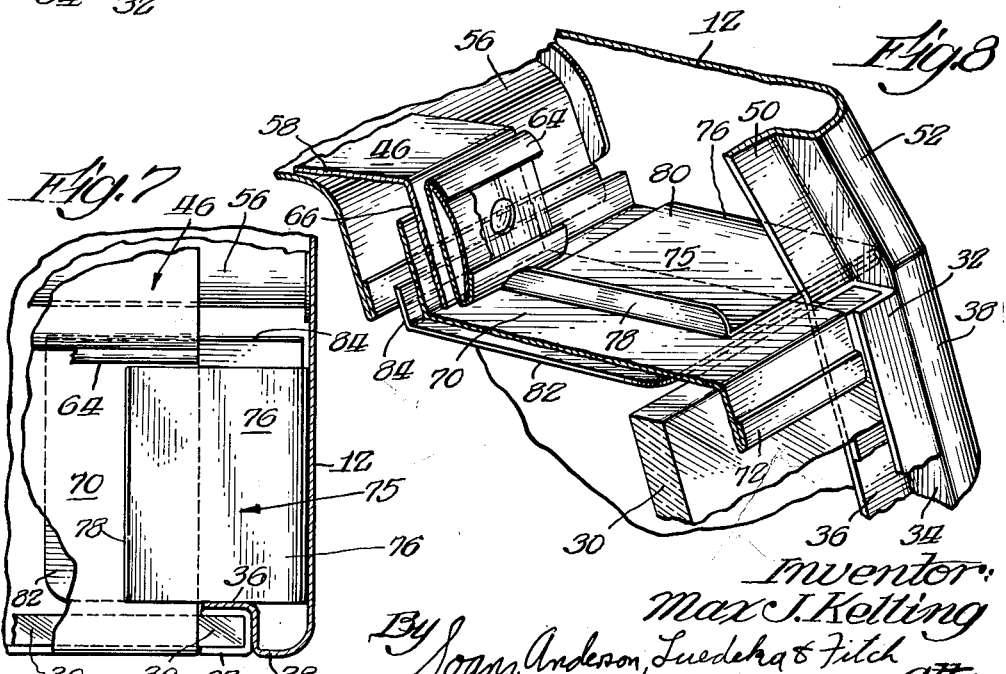
Inventor:
Max J. Kelling
By Soans, Anderson, Luedeka & Fitch
attys.

# United States Patent Office 3,073,661
Patented Jan. 15, 1963

3,073,661
DISPLAY CASE
Max J. Kelling, Wilmette, Ill., assignor to The Kelling Nut Co., Chicago, Ill., a corporation of Illinois
Filed July 20, 1959, Ser. No. 828,258
5 Claims. (Cl. 312—126)

This invention relates generally to nut display cases and more particularly to a nut display case construction which permits self-service and which keeps nuts under optimum conditions.

In the merchandising of nuts it is desirable for the consumer to receive nuts in prime condition, that is, the nuts should be fresh and heated. Ordinarily, nuts are served in heated condition from bulk trays which are heated or which are maintained in a heated chamber. If this is done, the nuts are fresh and have optimum aroma and palatability. While serving nuts from bulk trays provides a high quality product, it has the disadvantage in that the services of a clerk are required. In these days of self-service and high labor costs, such a method of merchandising can be quite costly.

Accordingly, an object of the present invention is the provision of a display case which can be used in the merchandising of nuts wherein the nuts are packaged in small quantities and are heated and maintained in a heated condition between the time they are packaged and the time they are sold. Another object is the provision of a nut display case which permits ready self-service. Still another object is the provision of a nut display case which may be easily cleaned. A further object is the provision of a nut display case which is so constructed that the nuts can be efficiently and uniformly heated.

Other objects and advantages of the present invention will become apparent by reference to the following description and accompanying drawings.

In the drawings:

FIGURE 1 is a perspective view of a nut display case showing various features of the present invention;

FIGURE 2 is an enlarged vertical sectional view taken generally along line 2—2 of FIGURE 1;

FIGURE 3 is an enlarged perspective view of the display tray together with the locking members shown in the display case of FIGURE 1;

FIGURE 4 is an exploded view of one corner of the tray shown in FIGURE 3;

FIGURE 5 is an enlarged transverse sectional view taken generally along 5—5 of FIGURE 1;

FIGURE 6 is an enlargement of a portion of the section shown in FIGURE 5;

FIGURE 7 is an enlarged fragmentary horizontal sectional view taken generally along line 7—7 of FIGURE 1; and FIGURE 8 is an enlarged fragmentary perspective view of one portion of the display case shown in FIGURE 1.

The nut display case shown in the drawings comprises a housing including a back wall, end walls, and a top wall. Means are provided for dividing the housing into a lower compartment adapted to hold a plurality of bins of bulk nuts, and an upper compartment adapted to support a large number of bags or packages of nuts. A transparent forward wall is provided on the lower compartment so that the consumer can see the nuts in the bins. Heating means are provided in the lower compartment for heating the nuts therein. The heat developed by the heating means circulates through an opening in the dividing means adjacent the back wall to the upper compartment and then forwardly over the packages of nuts and out through an opening in the front of the upper compartment. This heat maintains the packaged nuts in a warm condition until they are sold.

Periodically the seller scoops predetermined amounts of nuts from the bins into plastic bags, seals the bags and places them in the upper compartment. As the bags of nuts are sold, the seller may package more nuts from the supply in the bins and place them in the upper compartment. In this way, the nuts in the packages are always fresh and are maintained in a heated condition by the passage of air therethrough from the lower heated compartment.

More specifically, in the illustrated embodiment, the display case includes a housing 10, which is made of a high strength material such as steel, and is generally rectangular in horizontal cross section. The housing 10 is constructed so that it is self-sustaining and includes a pair of upright end walls 12, an upright back wall 14 suitably connected to the rear edge of the end walls 12, a lower front wall 16 suitably connected to the lower forward edges of the end walls 12, and a horizontally extending top wall 18 suitably connected to the upper edges of the end walls 12 and the back wall 14. The corners of the housing 10 are suitably rounded to enhance the appearance of the display case.

The housing 10 is divided into an upper and lower compartment 19 and 20, respectively, by a dividing means 21. In the illustrated embodiment, a plurality of rearwardly extending elongated bins 22 for bulk nuts are disposed in side-by-side relationship in the lower compartment 20. The bins 22 are supported by suitable means (not shown). A circular rotatable tray 23 is provided in the center of the lower compartment 20 and is suitably mounted to the housing 10. Elongated strips 24 for supporting advertising signs are provided above and inwardly of the upper edge of the lower front wall 16. The nuts in the lower compartment 20 are kept hot by heat from light bulbs 25 mounted to the dividing means 21 and electrical heating elements (not shown) disposed below the bins 22.

As shown in FIGURE 1, the back wall 14 above the bins 22 is provided with a polished panel 26 to enhance the appearance of the nuts displayed in the bins 22. Windows 28 are provided in the side walls 12 to allow the customer to view the nuts within the housing 10 from the sides thereof.

The front of the lower compartment 20 is enclosed by a rectangular front panel or wall 30 of transparent material. The panel 30 is connected to the housing 10 so that it may be pivoted about its lower edge for cleaning or other maintenance. As illustrated particularly in FIGURE 8, the side edges of the panel 30 are protected by a pair of channels 32 which are located in guideways 34 formed by inwardly directed flanges 36 connected to turned-back, forward marginal portions 38 of the end walls 12. The bottom edge of the transparent panel 30 is disposed behind the upper edge of the front wall 16. To enhance the appearance of the display case and also to allow the purchaser to view the nuts in the lower compartment 20 from above, the transparent panel 30 and the associated forward edges of the end walls 12 are slanted rearwardly.

As shown particularly in FIGURE 5, the dividing means 21 include a removable tray 46 supported by a support means 47. The tray 46 is of such a width that it can be inserted and removed through an opening 48 in the front of the upper compartment 19. The sides of the opening 48 are defined, as shown in FIGURE 8, by inwardly directed flanges 50 connected to turned-back, forward marginal portions 52 of the end walls 12. To further enhance the appearance of the display case, the forward edges of the end walls 12 above the transparent panel 30 are slanted rearwardly at an angle to the transparent panel 30.

As shown particularly in FIGURE 5, the support means 47 includes an irregularly shaped, generally horizontally extending support wall 53 extending between and connected to the side walls 12 of the housing 10. A space 54 is provided between the rear of the support wall 53 and the back wall 14 of the housing 10 to allow heat developed in the lower compartment 20 to rise along the rear wall 14, as indicated by the arrows 55 in FIGURE 5, and then pass forwardly in the upper compartment 19 out through the opening 48 in the front of the housing 10. In this way, not only are the packages of nuts in the upper compartment 19 kept hot, but the immediate area is filled with the aroma of hot nuts carried by the heated air from the lower compartment, thus adding to the salability of the nuts.

A longitudinally extending raised portion 56 of the support wall 53 supports a generally planar rearward display section 58 of the tray 46 in such a way that it extends rearwardly at a downward angle. In this way, the packages of nuts which are disposed in rows on the display section 58, lay rearwardly against each other in substantially upright relationship. A rearward marginal portion 60 of the tray 46 is turned upwardly to provide a rearward support for the packages.

The tray 46, and thus the packages thereon, may be additionally heated by an electrical heating element 61 connected to the lower surface of the display section 58. Since the heating element 61 is disposed in a cavity 62, which is defined between the bottom of the tray 46 and the support wall 53, heat developed by the electrical heating element 61 is more uniformly distributed to the lower surface of the tray 46. Also, since the side edges of the tray 46 do not extend to the end walls 12, the heated air circulates through the cavity 62 and out through the opening 48. Of course, if the nuts are sold fast enough, the additional heating element may not be necessary.

As shown in FIGURE 5, elongated, horizontally extending, advertising-supporting strips 64 are suitably connected to the rearward surface of the upwardly turned portion 60, and to a section 66 of the tray 46 which extends downwardly at a forward angle from the forward edge of the display section 58. Transversely extending L-shaped partitions 68 are disposed on the display section 58 to aid in the separation of the rows of articles. The partitions 68 are prevented from moving forwardly by a longitudinally extending rib 69 in the forward portion of the display section 58.

As shown particularly in FIGURE 3, a generally planar extention 70 of the tray 46 extends forwardly generally perpendicularly to the transparent panel 30 from the lower edge of the downwardly extending section 66, the forward portion of the extension 70 being disposed on the upper edge of the transparent panel 30. A downwardly extending flange 72 at the forward edge of the extension 70 bears against the outside upper marginal edge of the transparent panel 30 to prevent rearward movement of the tray 46. Forward movement of the tray 46 relative to the transparent panel 30 is prevented by a longitudinally extending angle bar 74 suitably connected to the lower surface of the extension 70 and spaced so as to bear against the inside, upper marginal edge of the transparent panel 30.

The tray 46 is locked in position, and thus the transparent panel 30 is prevented from moving, by the locking member 75 which is slidably disposed on each marginal side portion of the extension 70 of the tray 46. As shown particularly in FIGURES 4 and 8, each locking member 75 includes a generally U-shaped body part 76 which straddles the associated marginal side portion of the extension 70 and extends sideways therefrom.

An upwardly extending tab 78 is provided at the end of the upper leg 80 for manipulating the locking member 75. The lower leg 82 of the body part 76 is extended rearwardly and is provided with an upwardly extending flange 84 which in cooperation with the downwardly extending section 66 of the tray 46 prevents forward movement of the locking member 75.

When the locking members 75 are in their locked positions, that is, in positions against the end walls 12 of the housing 10, the locking members 75 are disposed beneath the rearwardly slanting flanges 50 of the upper compartment 19. In this position of the locking members 75, the tray 46 cannot be moved upwardly due to the camming action between the forward edges of the locking members 75 and the rearward surfaces of the flanges 50.

In order to remove the tray 46 for cleaning or for other maintenance, the locking members 75 are moved inwardly to a position in which they clear the inner edges of the flanges 50, thus permitting the tray 46 to be removed through the opening 48 in the front of the housing 10.

In the illustrated embodiment, a portion (not shown) of the back wall 14 of the housing 10 is made removable to permit access to the bins 22 to fill packages with nuts and to permit the replenishment of the packages in the tray 46 from the rear of the rows.

As can be seen from the above, a display case is provided which displays a large quantity of nuts in packages and nuts in bulk form, the purchaser being able to serve himself with the packages of nuts. The display case is so constructed that it can easily be cleaned and yet its construction prevents sampling of the loose nuts in the bins. Moreover, the display case construction affords relatively efficient and uniform distribution of heat developed therein to the nuts. Furthermore, the display case construction permits the aroma from the hot nuts to fill the immediate vicinity of the display case, thus increasing the salability of the nuts.

Various changes and modifications may be made in the above described nut display case without departing from the spirit or scope of the invention. Various of the features of the invention are set forth in the accompanying claims.

I claim:

1. A nut display case comprising a housing including a back wall, end walls and a top wall, means dividing said housing into upper and lower compartments, a transparent forward wall in said lower compartment, the front of said upper compartment being open, said dividing means including a support wall extending between said end walls, and a removable tray supported by said support wall in such a way that a cavity is defined therebetween, a slidable locking member securing said tray in position, and heating means in said cavity, the ends of said tray being spaced from the end walls whereby heated air is caused to move through the cavity, upwardly into said upper compartment and thence out through the open front of said upper compartment.

2. In a nut display case housing including end walls, a back wall, top wall and a lower transparent front wall, the upper portions of the forward edges of the end walls being slanted rearwardly and being provided with inwardly directed flanges, a removable tray approximately the same width as the distance between the inner edges of the flanges, means for supporting said tray so that the forward corner portions thereof are adjacent the inner edges of the flanges, and means for removably securing said tray on said supporting member including a locking member extending sideways from each forward corner portion of said tray at the rear of the associated flange, said locking member being slidable from a first position to a second position and being of such a size as to bear against the rearward surface of the associated flange to prevent movement of the tray when said locking member is in the first of said positions, but located so as not to bear against said flange when in the second of said positions, whereby said tray may be fastened or unfastened within said case by the sliding of said locking member to one of said positions.

3. In a nut display case housing including end walls, a back wall, a top wall and a lower transparent front wall, the portions of the forward edges of the end walls above the front wall being slanted rearwardly and being provided with inwardly directed flanges, a removable tray approximately the same width as the distance between the inner edges of the flanges, means for supporting said tray so that it extends rearwardly from the upper edge of said front wall, a downwardly extending flange on the forward edge of said tray being disposed adjacent the outside surface of the front wall, a member extending downwardly from said tray adjacent the inside surface of said front wall, a locking member extending sideways from each forward corner portion of said tray at the rear of the associated flange, said locking member being slidable from a first position to a second position and being of such a size as to bear against the rearward surface of the associated flange when said locking member in the first of said positions, but located so as not to bear against said flange when in the second of said positions, whereby said tray and, hence, the upper portion of said front wall, may be fastened or unfastened by the sliding of said locking member to one of said positions.

4. In a nut display case including a housing, a removable tray approximately as wide as the housing and having generally planar forward corner portions, means for supporting said tray in the housing, at least one locking member for removably securing the tray on said supporting means, said locking member comprising a U-shaped body part slidably straddling one of the forward corner portions of the tray and extending sideways therefrom, the lower leg of said body part having a rearward extension, an upwardly extending tab at the rearward edge of said rearward extension, said tab being disposed rearwardly of an upwardly extending portion of said tray to prevent forward movement of the locking member, the forward edge of said body part cooperating with a flange extending inwardly from the side wall of the housing whereby movement of the tray is prevented.

5. A nut display case comprising a housing including a back wall, end walls and a top wall, tray means dividing said housing into upper and lower compartments and adapted to support a quantity of packaged nuts and including means connected along the rearward edge thereof for preventing rearward movement of packages disposed thereon, said rearward edge being spaced from said back wall so as to permit the passage of air upwardly from said lower compartment intermediate the rearwardmost packages and said back wall, means in said lower compartment for displaying a quantity of bulk nuts, said lower compartment being provided with a transparent forward wall, the front of said upper compartment being open so as to permit the passage of air outwardly therefrom, heating means in said lower compartment, and means defining an opening in said tray means adjacent said back wall, whereby heated air in said lower compartment is caused to move upwardly through the opening defined in said tray means and into said upper compartment and thence out through the open front of said upper compartment whereby the aroma of the bulk nuts in the lower compartment passes forwardly across the packaged nuts to the atmosphere.

References Cited in the file of this patent

UNITED STATES PATENTS

| | | |
|---|---|---|
| 1,940,505 | Paulick | Dec. 19, 1933 |
| 1,990,398 | Bedding Field | Feb. 5, 1935 |
| 2,018,024 | Kress | Oct. 22, 1935 |
| 2,123,394 | Anderson | July 12, 1938 |
| 2,529,826 | Walker | Nov. 14, 1950 |
| 2,574,242 | Brill | Nov. 6, 1951 |
| 2,758,348 | Simpson | Aug. 14, 1956 |
| 2,821,449 | Miller | Jan. 28, 1958 |